United States Patent

Shinohara et al.

Patent Number: 5,493,859
Date of Patent: Feb. 27, 1996

[54] ENGINE WITH AN ADSORBER

[75] Inventors: Yukihiro Shinohara, Anjo; Toshihiko Igashira, Toyokawa; Tohru Yoshinaga, Okazaki; Masatoshi Basaki, Nishio, all of Japan

[73] Assignee: Nippondenso Co., Ltd., Kariya, Japan

[21] Appl. No.: 183,944

[22] Filed: Jan. 21, 1994

[30] Foreign Application Priority Data

Jan. 21, 1993 [JP] Japan .................................. 5-026087

[51] Int. Cl.⁶ ......................................................... F01N 3/28
[52] U.S. Cl. ............................. 60/302; 60/297; 60/311
[58] Field of Search ........................... 60/302, 297, 313, 60/311, 323, 272

[56] References Cited

U.S. PATENT DOCUMENTS

| | | | |
|---|---|---|---|
| 3,173,451 | 3/1965 | Slayter | 60/302 |
| 3,644,098 | 2/1972 | DePalma | 60/302 |
| 3,804,597 | 4/1974 | Inoue | 60/299 |
| 3,807,173 | 4/1974 | Zmuda | 60/302 |
| 3,881,316 | 5/1975 | Bunda | 60/302 |
| 3,972,184 | 8/1976 | Warren | 60/274 |
| 4,735,046 | 4/1988 | Iwai | 60/297 |
| 4,887,427 | 12/1989 | Shinzawa | 60/286 |
| 4,924,820 | 5/1990 | Lear | 60/302 |
| 5,209,062 | 5/1993 | Vollenweider | 60/302 |

*Primary Examiner*—Ira S. Lazarus
*Assistant Examiner*—Alfred Basichas
*Attorney, Agent, or Firm*—Cushman, Darby & Cushman

[57] ABSTRACT

An object is to capture unburned fuel immediately after startup of an engine effectively. A vessel is disposed in an exhaust manifold of an engine and opened only at one end, its opening directed toward exhaust ports. Catalyst carrier is stored in the vessel. Since exhaust material has high specific gravity as compared to that of vaporized exhaust gas, the unburned fuel is exhausted rectilinearly from the exhaust ports due to its inertia, entering the vessel to be captured in the catalyst carrier. When the temperature of the catalyst reaches the temperature required for activating as the exhaust gas temperature rises, exhaust material is exhausted with purified condition. Since the vessel is opened only at one end, the current passing through this does not occur, making it possible to prevent the damage of the catalyst carrier due to the excessive high-temperature.

11 Claims, 9 Drawing Sheets

211   212   211   212

ENGINE WITH AN ADSORBER

BACKGROUND OF THE INVENTION

1. Field of the Invention

This invention relates to an adsorber to adsorb materials exhausted from an internal combustion engine.

2. Description of Related Art

Inventors tried the following experiments in the laboratory (these are not publically known) for the improvement of exhaust emission of an engine: Disposing an oxidation catalyst in the exhaust pipe to convert exhaust material such as hydrocarbons (HC) into innocuous carbon dioxide ($CO_2$) and water ($H_2O$), for example. However, the above described catalyst is not activated sufficiently until exhaust temperature rises to the desired temperature, causing a problem that exhaust material is not removed. The alternative method can be one in which the catalyst is disposed in the exhaust manifold to let the exhaust gas pass through where the temperature rises immediately after startup of an engine. However, it is feared that the temperature rises so high at full engine load that the catalyst or its metallic carrier is damaged by heat. Also, additional problems occur, such as catalyst activity reduction due to the direct influence by lead (Pb), phosphorus (P), sulfur (S) or other exhausted materials, or the increase in pressure loss immediately after the exhaust from cylinders, which caused a decrease in torque, making it impossible to apply this alternative method in practical use.

Summary of the Invention

An object of the present invention is to provide an adsorber which can effectively capture the materials exhausted from an engine immediately after startup of the engine. The adsorber of the present invention is constructed to comprise: an exhaust port effusing exhaust gas exhausted from an engine cylinder; an exhaust manifold disposed downstream of the exhaust port and for collecting the exhaust gas from the exhaust port; adsorbing means for adsorbing exhaust material from the exhaust port in the exhaust manifold and having an opening at one end to receive the exhaust gas, the opening facing toward the exhaust port to receive the exhaust gas directly. In the adsorber constructed as described above, the materials having higher specific gravity than exhaust gas are exhausted rectilinearly from the exhaust ports due to their inertia, and enter the opening to be captured in the adsorbent. Since the opening is disposed at only one end, air current passing through the adsorbent does not occur. Therefore, high-temperature exhaust gas practically does not flow through the adsorbent, causing no damage of the adsorbent due to the excessive high-temperature exhaust gas. Also, the emission of pollutant under the condition where the main catalyst in the exhaust pipe is not activated immediately after startup of an engine can be effectively decreased. Since the exhaust gas does not flow through the adsorbent, large pressure loss does not occur so that the engine output power is not lost.

DETAIL DESCRIPTION OF PREFERRED EMBODIMENTS

Figure 1:
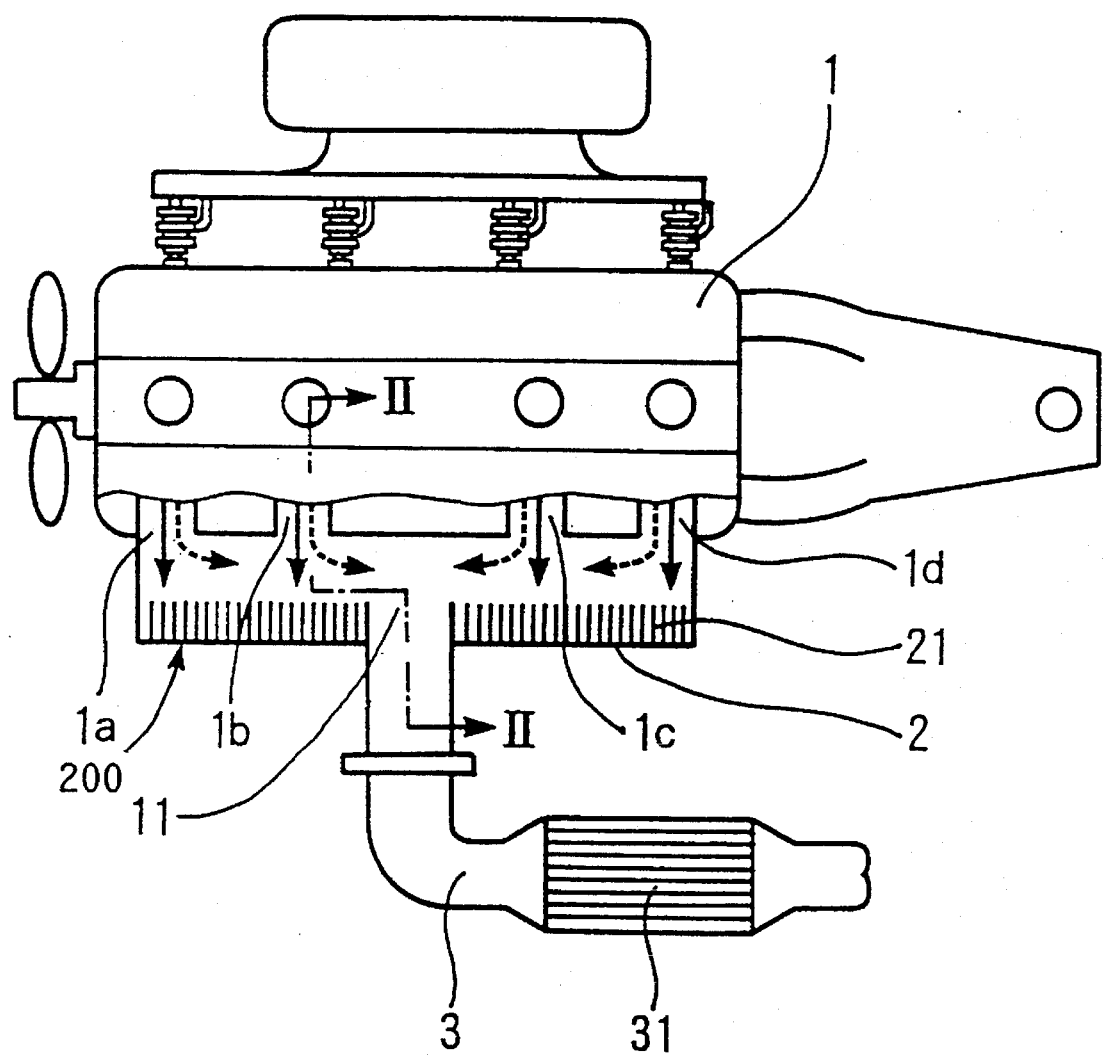
FIG. 1 is a schematic plan view with partial cross section of an engine provided with an adsorber, which is the first embodiment of the present invention.
Figure 2:
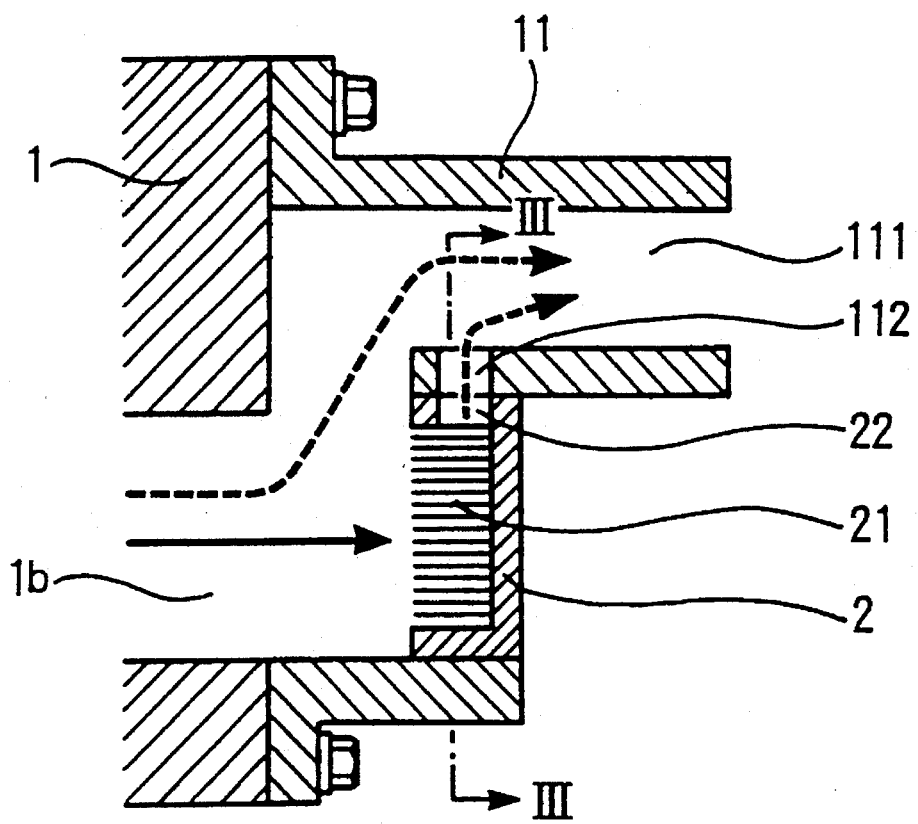
FIG. 2 is a vertical sectional view of an exhaust manifold taken along the line II—II of FIG.1.

As FIG. 1 shows, a vehicle engine with four cylinders 1 has four exhaust ports 1a, 1b, 1c and 1d. The exhaust gas (represented by broken lines in the figure) exhausted from the exhaust ports 1a to 1d is collected in the exhaust manifold 11 to effuse into the exhaust pipe 3 connected to the exhaust manifold 11. The main catalyst 31 is located in the exhaust pipe 3. The adsorber 200 has a vessel 2 disposed along the sidewall of the engine 1 to cover and face the exhaust ports 1a to 1d. As shown in FIG. 2, the vessel 2 forms a dead-end box opened toward the exhaust ports 1a to 1d, and is welded securely to the outer wall of the exhaust manifold 11 to form part of the outer wall. The current in the exhaust manifold 11 passes through the exhaust port 1b toward the exit 111 along the curved path as shown in FIG. 2.

Figure 3:
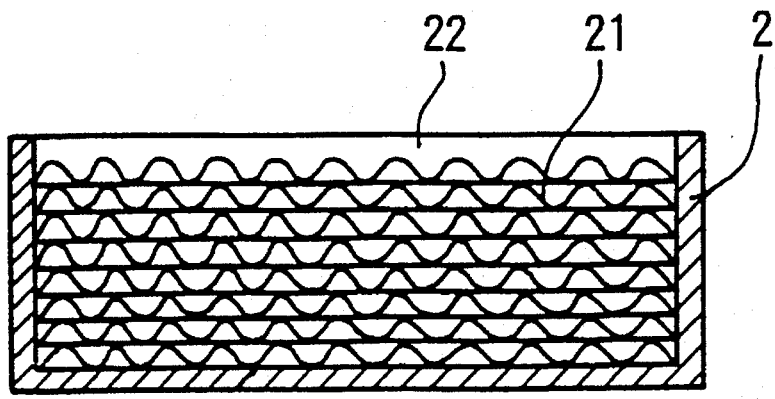
FIG. 3 is a sectional view of the adsorber taken along the line III—III of FIG.2.
Figure 4:
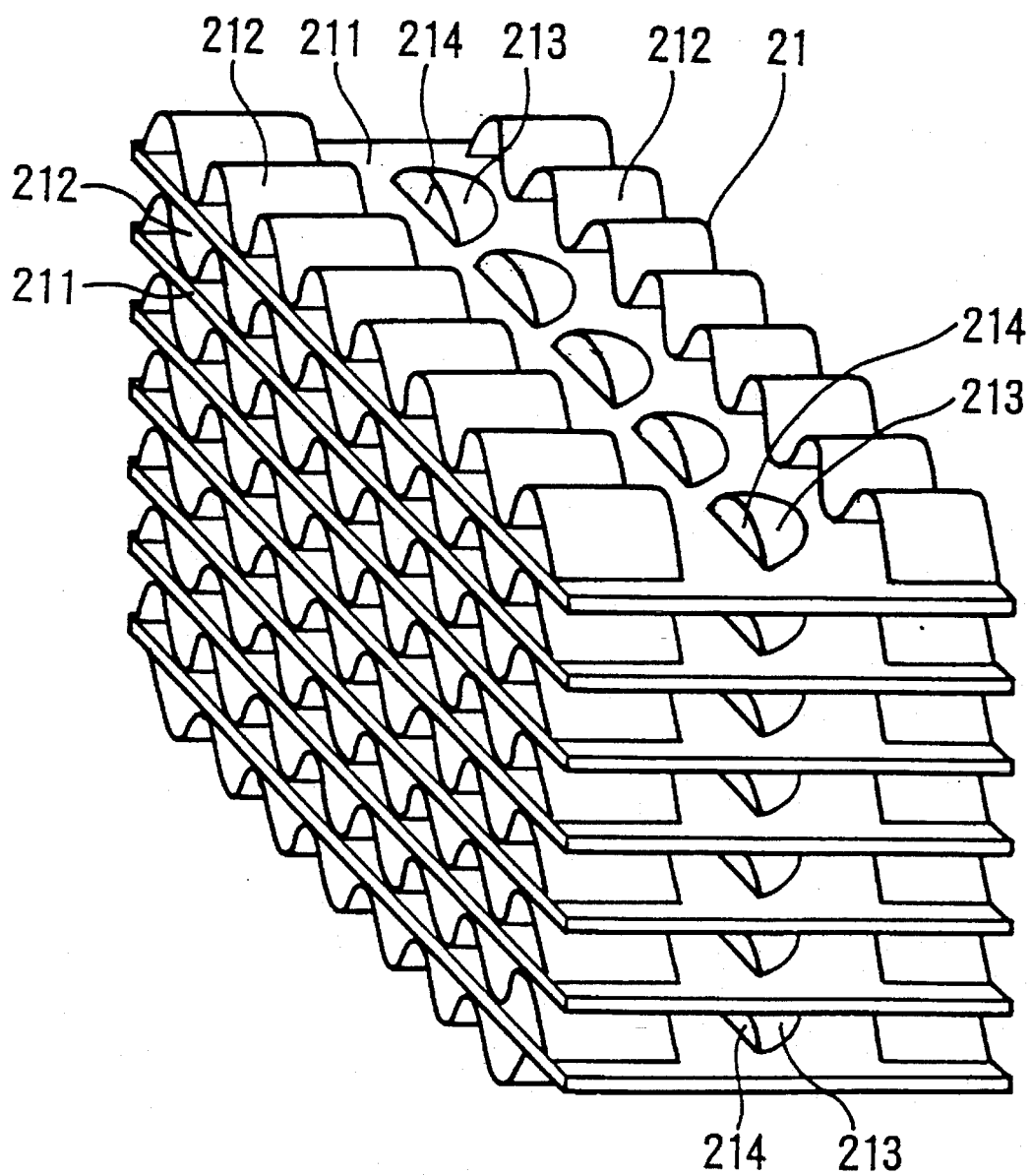
FIG. 4 is a perspective view of catalyst carrier constructed in the adsorber.

The vessel 2, which has a rectangular shape in the front view from the exhaust ports 1a to 1d (as shown in FIG. 3), has an opening 22 extending longitudinally at the top wall. The opening 22 connects with an opening 112 disposed at the wall of the exhaust manifold 11. The catalyst carrier 21, which serves also as an adsorbent, is accommodated in the vessel 2 as shown in FIG. 4.

The adsorbent is formed by alternately placing plane and corrugated plates. For example, plane plates 211 and corrugated plates 212 are made of foil having a plate thickness of approximately 50 micrometers which is composed of 20% chromium (Cr), 5% aluminum (Al) and 75% iron (Fe). These plates are connected with each other by brazing, etc. Two rows of the corrugated plates 212 are disposed on the plane plate 211. An opening 215 formed by the plane plate 211 and corrugated plate 212 faces to the exhaust ports 1a to 1d. Here, the plane plates 211 are cut in the form of a louver 213 at several points in the longitudinal direction, to serve as flow holes 214 connecting in a vertical direction. The flow holes 214 connect with the opening 22 disposed at the top wall of the vessel 2 (FIG. 2).

The plane plates 211 and corrugated plates 212 of the carrier 21 are coated with activated alumina, etc., and contain noble metals such as platinum (Pt) or palladium (Pd) which are catalyst compositions. Most of the exhaust gas exhausted from the left side of the figure changes its direction to flow upward as represented by the broken lines in FIG. 2, and effuse from the exit 111 into the exhaust pipe 3. However, the other of the exhaust gas flows between the plane plates 211 and corrugated plates 212 in the carrier 21, and is guided upward by the louvers 213 to effuse from the flow holes 214 into the exit 111 passing through the opening 22.

In the above construction, the exhaust material exhausted immediately after startup of the engine is exhausted rectilinearly from the exhaust ports 1a to 1d due to its inertia because the exhaust material has high specific gravity, and directly enters the adsorber. The exhaust gas is pulsated immediately after startup, in other words the exhaust gas enters the adsorber intermittently during idling. Therefore the carrier 21 captures the exhaust material on the wide range of catalyst surface by pulsated exhaust gas during idling, as represented by the continuous lines in FIGS. 1 and 2.

Most of the exhaust gas which has lower specific gravity flows along the air current passage as described by the broken lines in FIG. 2 into the exit 111 through the exhaust manifold 11 with the broader sectional area, without entering the adsorber. In this case, pressure loss is small.

Since the part of the exhaust gas flows into the exit 111 passing through the adsorber as described above, the exhaust material which is comparatively small in particle diameter (and consequently light) is effectively carried into the adsorber to be adsorbed.

As the engine is warmed up and the temperature of the exhaust gas becomes high, the temperature of the adsorber in the manifold 11 rises. When the temperature reaches the temperature required for activating the catalyst, the exhaust material adsorbed on the catalyst is purified while it is vaporized by heat and effused through the exit 111. Since the flow holes 214 are covered by the louvers 213, the surface of the adsorber does not decrease if the flow holes 214 are disposed, making it possible to obtain sufficient purification effect.

For this construction, the unburned fuel exhausted immediately after startup of the engine is captured sufficiently using the adsorber and exhausted with purified condition, making it possible to greatly improve the exhaust emission.

In the adsorber, only the part of the exhaust gas flows. In other words, since the engine is warmed up and the rotation of the engine is much higher than the idling, the exhaust gas flows continuously. The adsorber is always pressurized by the exhaust gas. In and out flow of exhaust gas does not occur. Therefore the adsorber does not adsorb the exhaust gas under such pressurized condition. The temperature of the adsorber does not become so high even when high-temperature exhaust gas occurs at high engine load, making it possible to prevent the damage of the adsorber. According to the experiment, the temperature of the exhaust gas is about 850° C., the temperature of the exhaust manifold at the place where all exhaust gas gather is about 900° C. and the outer surface of the adsorber which receives the exhaust gas directly has almost same temperature but the interior surface of the adsorber which is in the middle between the outer surface and furthest portion of the adsorber has about 750° C. The adsorber releases heat outside.

In addition, since the vessel 2 of the adsorber is a closed vessel opened only at one end, scoping effect, in which the metallic carrier subjected to high temperature is damaged as regressed, does not occur. In this embodiment, the carrier 21 contains the catalyst to serve as an adsorbent. A simple adsorber such as zeolite may be used. In this case, the unburned fuel dissociated from the adsorbent due to the increase in the temperature flows from the exhaust manifold 11 into the exhaust pipe 3 (FIG. 1) and is cleaned by the main catalyst 31 in the exhaust pipe 3 where the temperature reaches the temperature required for activating. The carrier 21 may be made of the ceramic honeycomb, etc., instead of the metallic foil. Also, pellet catalyst in which ceramic particles contain catalyst may be used instead of the honeycomb carrier. Activated alumina, zeolite, etc., which have large surface areas may be used instead of the catalyst.

Figure 5:
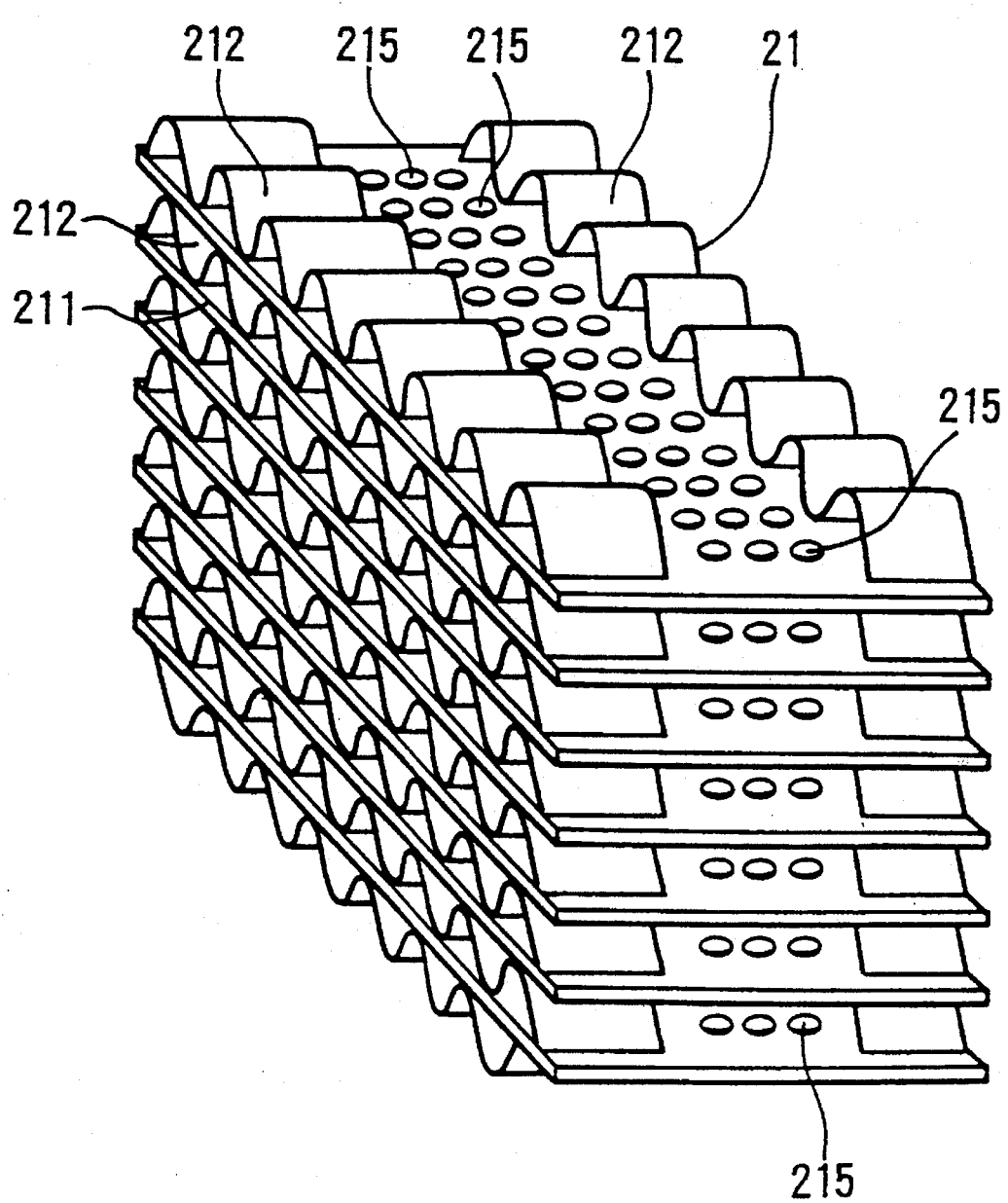
FIG. 5 is a perspective view of catalyst carrier in the second embodiment of the present invention.

In the second embodiment of the present invention, the flow holes 214 disposed at the plane plates 211 of the carrier 21 can be replaced with a large number of pores 215 as shown in FIG. 5, making it possible to obtain the same effect.

Figure 6:
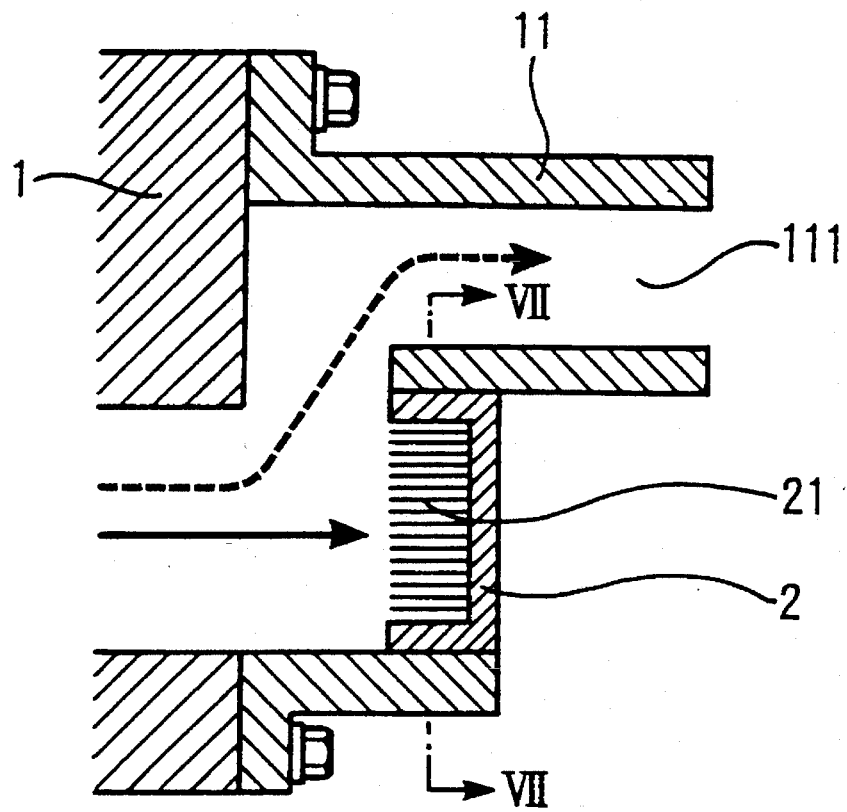
FIG. 6 is a vertical sectional view of an exhaust manifold in the third embodiment of the present invention.
Figure 7:
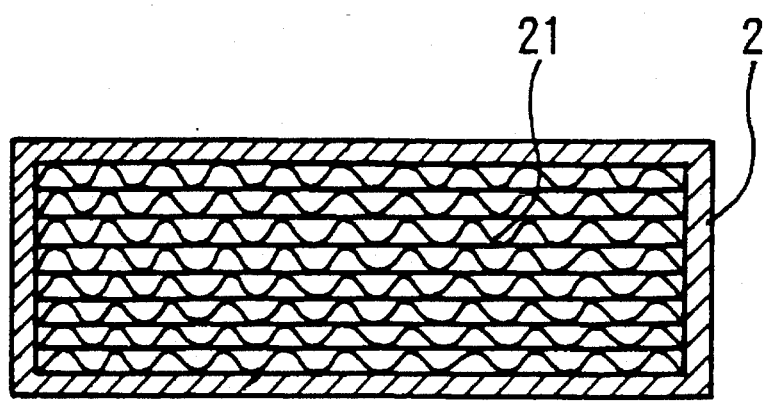
FIG. 7 is a sectional view of an adsorber taken along the line VII—VII of FIG. 6.

In the third embodiment of the present invention as shown in FIGS. 6 and 7, the opening of the vessel 2 and the opening of the exhaust manifold 11 are reduced, because the amount of the unburned fuel exhausted is comparatively small in high speed engines, etc. Since the gas does not flow in the adsorber at all, this adsorber has high structural durability.

Figure 8:
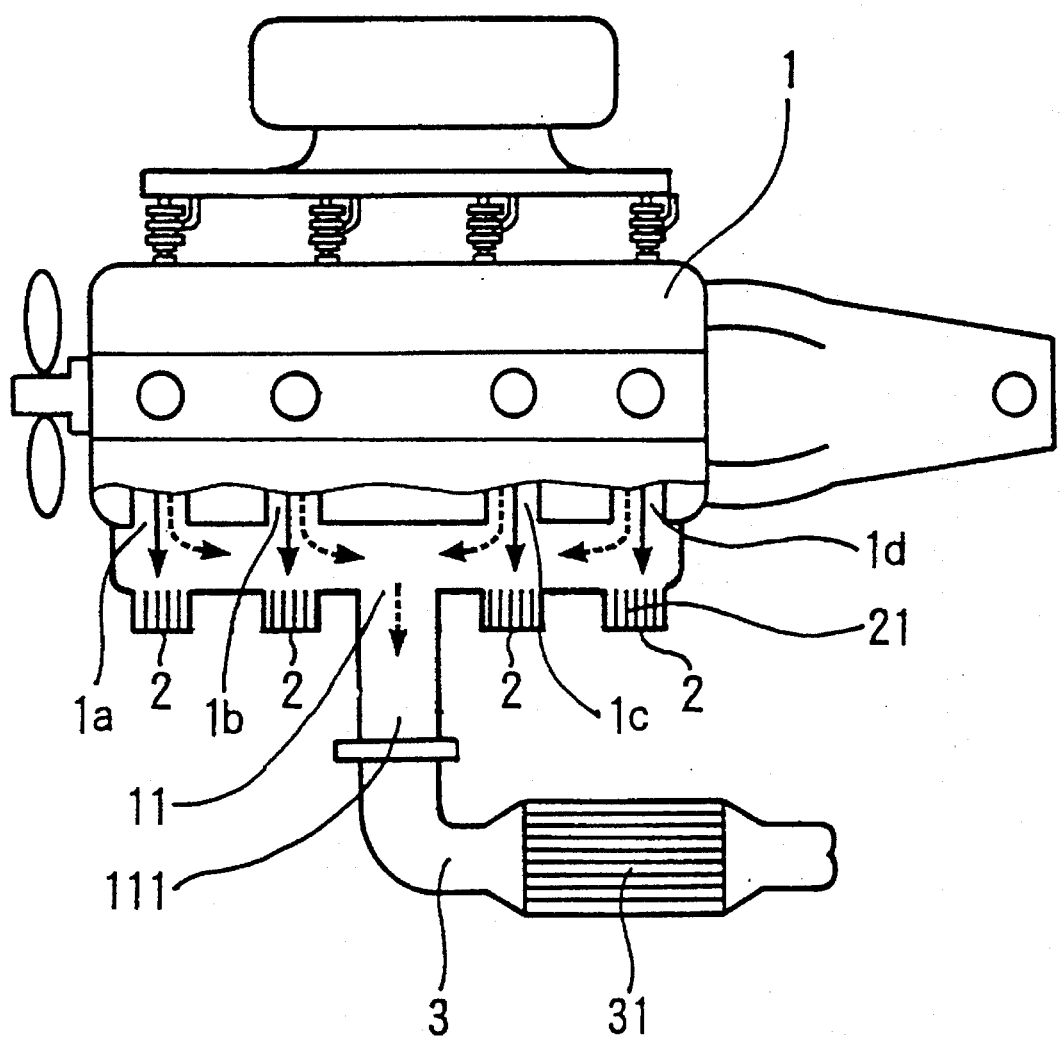
FIG. 8 is a schematic plan view with partial cross section of an engine provided with an adsorber, which is the fourth embodiment of the present invention.
Figure 9:
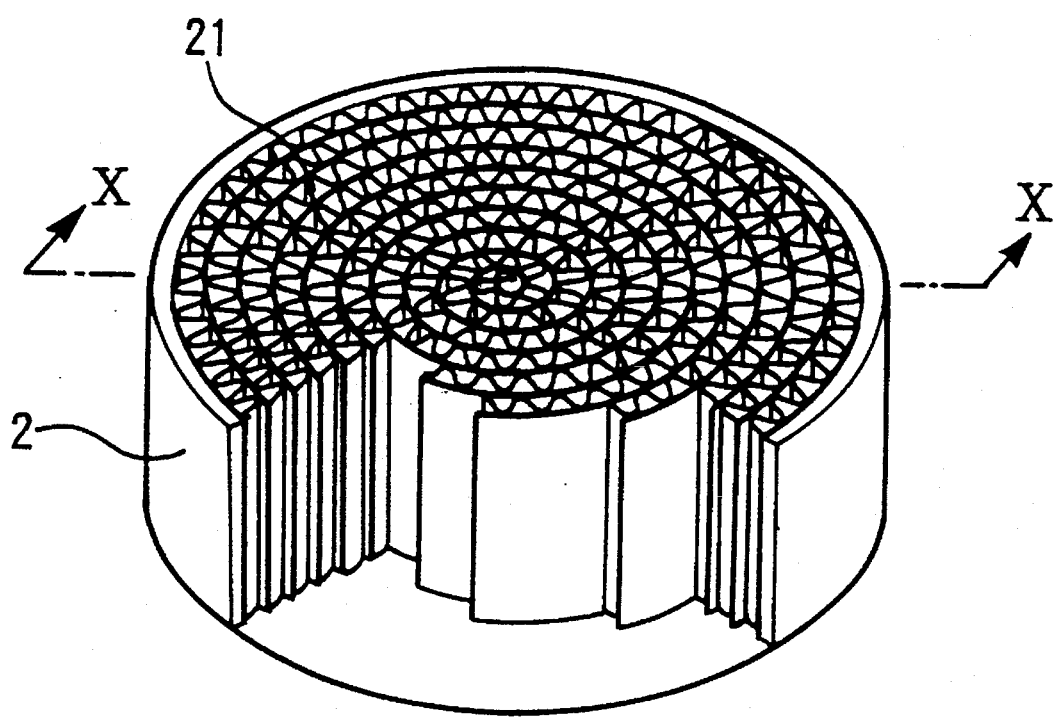
FIG. 9 is a break perspective view of the adsorber.
Figure 10:
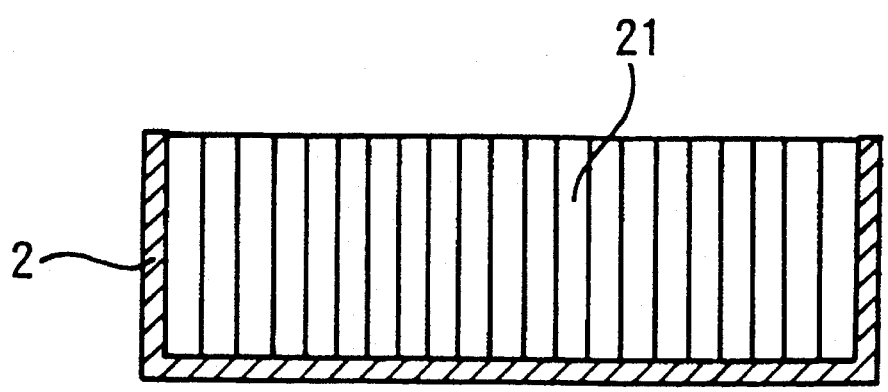
FIG. 10 is an end view taken along the line X—X of FIG. 9.
Figure 11:
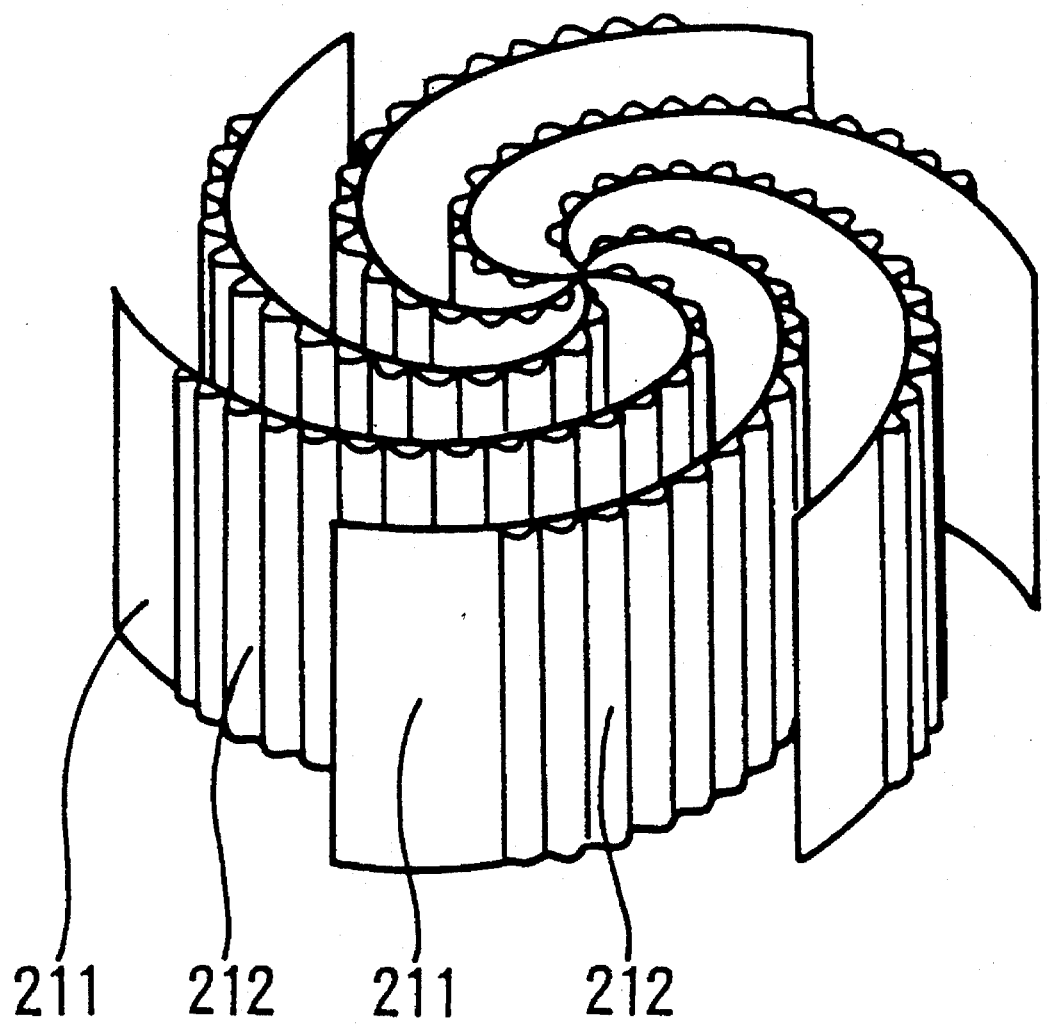
FIG. 11 is an exploded perspective view of the catalyst carrier.

In the fourth embodiment of the present invention as shown in FIG. 8, several vessels 2 are disposed at the outer wall of the exhaust manifold 11 facing the exhaust ports 1a to 1d of the engine 1, with their openings directed toward each exhaust port 1a to 1d. The carrier 21 is stored in the vessel 2. The details of this embodiment are shown in FIGS. 9 and 10. The honeycomb carrier 21 is disposed in the circular vessel 2 which is opened upward. As shown in FIG. 11, the carriers 21 are constructed by accumulating the plane plates 211 and corrugated plates 212 alternately in the form of a spiral and connected by brazing. For the above structure, it is possible to obtain the same effect as in the above described embodiments. The flow holes which connect with the exit 111 of the exhaust manifold 11 may be disposed at each vessel 2 in the same manner as in the first embodiment.

Figure 12:
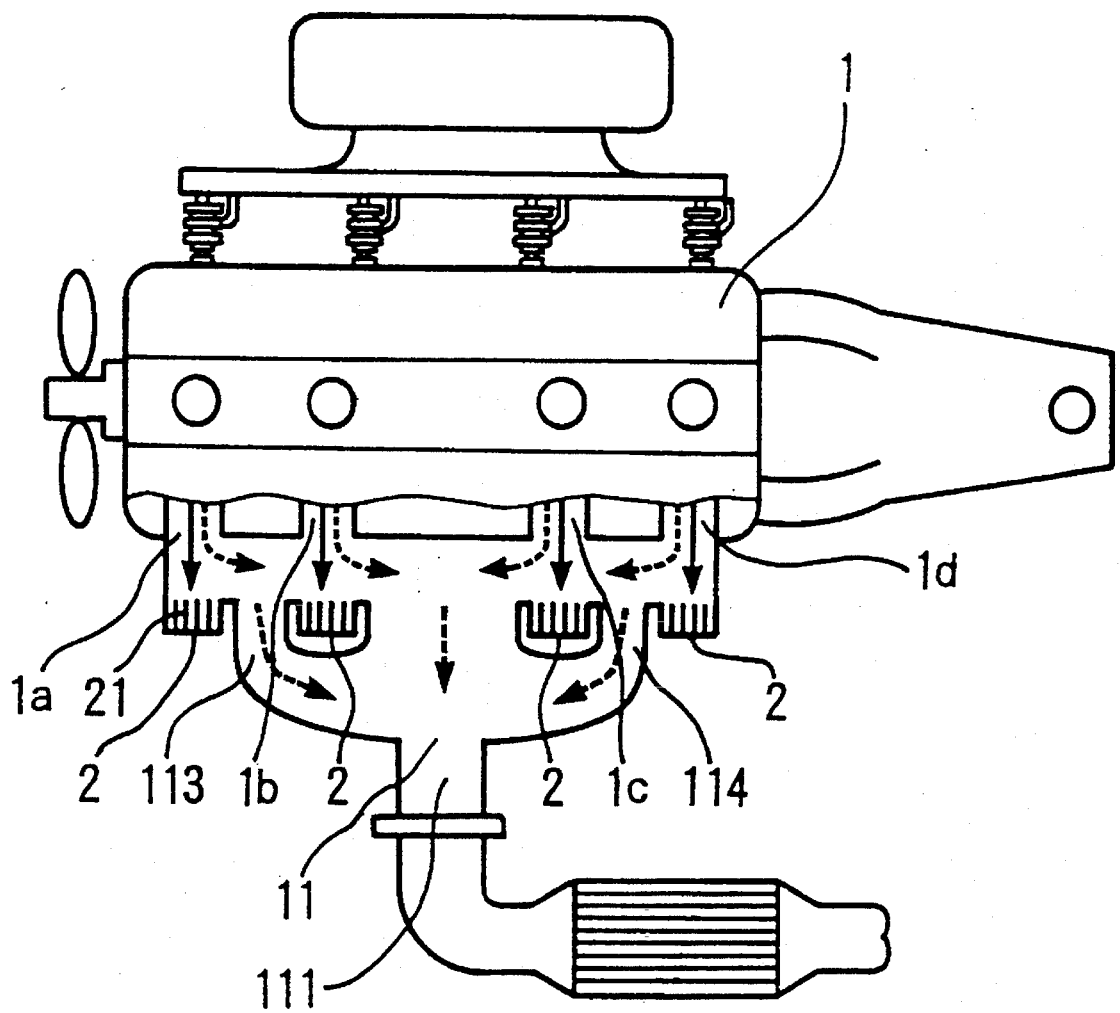
FIG. 12 is a schematic plan view, partially in cross section of an engine provided with an adsorber, which is the fifth embodiment of the present invention.

In the fifth embodiment of the present invention as shown in FIG. 12, the current passages 113 and 114 which have longer sectional area are formed between the left two vessels 2 and right two vessels 2, respectively, with directed toward the exit 111 in the exhaust manifold 11. Therefore, the exhaust gas from the exhaust ports 1a and 1d is smoothly guided toward the exit 111 passing through the flow passages 113 and 114, respectively, without greatly bending in the same manner as in the above described embodiments (represented by the broken lines). In the above embodiments, the material exhausted from the engine is assumed to be unburned fuel. However, the present invention can be applied to other materials such as carbon exhausted from the engine to obtain the same effect as in the above described embodiments.

Other modifications are described hereafter. For example, in FIG. 8 in order to improve the adsorbing efficiency of the carrier 21, each two of the circular vessels 2 may be connected with each pipe, and further all circular vessels 2 may be connected with one pipe to lead out and in exhaust gas from one vessel to other vessels to improve the adsorbing efficiency. In these modifications, the carriers 21 may be disposed in the circular vessels 2 in such a manner to maintain a space inside the vessels 2 between the carriers 21 and the outer wall of the exhaust manifold to which the pipe is connected.

We claim:

1. An engine with an adsorber for adsorbing exhaust material, said engine comprising:

an exhaust port for conveying exhaust gas discharged from an engine cylinder;

an exhaust manifold disposed downstream from said exhaust port for collecting the exhaust gas conveyed by said exhaust port; and adsorbing means, in said manifold, for adsorbing exhaust material from said exhaust port, said adsorbing means having an open first end and a closed second end and being disposed at a predetermined distance from said exhaust port in said exhaust manifold, said open end facing opposite to a flow direction of the exhaust gas flowing from said exhaust port, wherein said adsorbing means includes a catalyst which adsorbs exhaust material in pulsating exhaust gas conveyed by said exhaust port after startup of the engine to thereby purify the exhaust gas when said catalyst is activated, and wherein said catalyst includes a vessel, disposed in said exhaust manifold, having an opening at one end which is directed toward the engine cylinder exhaust port, and a catalyst carrier including plane and corrugated plates made of metal foil alternately disposed in said vessel.

2. An engine according to claim 1, further comprising:

an exhaust pipe connected to said exhaust manifold at a downstream end of said manifold; and a main catalyst, disposed in said exhaust pipe, for purifying exhaust material vapored from said adsorbing means.

3. An engine according to claim 1, wherein said exhaust manifold comprises:

a first passage extending from the exhaust port to pass the exhaust gas therefrom; and a second passage disposed downstream from said first passage to pass the exhaust gas from said manifold, said first passage and said second passage being offset from each other and in communication with each other.

4. An engine according to claim 3, wherein said first passage communicates with said second passage at a position lower than said second passage so that exhaust material vaporized from said adsorbing means flows into said second passage.

5. An engine according to claim 4, wherein said adsorbing means has an opening to permit communication between an inner portion thereof and said second passage.

6. An engine with an adsorber adsorbing exhaust material, said engine comprising:

an exhaust port for conveying exhaust gas discharged from an engine cylinder;

an exhaust manifold disposed downstream from said exhaust port for collecting the exhaust gas conveyed by said exhaust port;

adsorbing means, in said manifold, for adsorbing exhaust material from said exhaust port, said adsorbing means having an opening at one end to receive the exhaust gas, said opening facing toward said exhaust port to receive the exhaust gas directly;

an exhaust pipe connected to said exhaust manifold at a downstream end of said manifold; and a main catalyst, disposed in said exhaust pipe, for purifying exhaust material vapored from said adsorbing means;

wherein said adsorbing means includes a catalyst which adsorbs exhaust material in pulsating exhaust gas conveyed by said exhaust port after startup of the engine to thereby purify the exhaust gas when said catalyst is activated; and said catalyst includes a vessel, disposed in said exhaust manifold, having an opening at one end which is directed toward the engine cylinder exhaust port, a catalyst carrier including plane and corrugated plates made of metal foil disposed in said vessel, and at least one noble metal coating on said plane and corrugated plates.

7. An engine according to claim 6, wherein said exhaust manifold comprises:

a first passage extending from the exhaust port to pass the exhaust gas therefrom; and a second passage disposed downstream from said first passage to pass the exhaust gas from said manifold, said first passage and said second passage being offset from each other and in communication with each other.

8. An engine according to claim 7, wherein said vessel has an opening communicating with said second passage.

9. An engine according to claim 8, wherein said plane plates have louvers at a plurality of points in the longitudinal direction and a plurality of flow holes in said louvers permitting said opening to communicate with said second passage.

10. An engine according to claim 8, wherein said plane plates have a plurality of pores permitting said opening to communicate with said second passage.

11. An engine according to claim 1, wherein at least one noble metal is coating on said plane and corrugated plates.

* * * * *